United States Patent
Rürup

(10) Patent No.: US 7,111,668 B2
(45) Date of Patent: Sep. 26, 2006

(54) COOLING ARRANGEMENT FOR AN OFFSHORE WIND ENERGY INSTALLATION

(75) Inventor: Jörn Rürup, Ritterhude (DE)

(73) Assignee: Rittal GmbH & Co. KG, Herborn (DE)

( * ) Notice: Subject to any disclaimer, the term of this patent is extended or adjusted under 35 U.S.C. 154(b) by 76 days.

(21) Appl. No.: 10/854,924

(22) Filed: May 27, 2004

(65) Prior Publication Data

US 2005/0006905 A1    Jan. 13, 2005

(30) Foreign Application Priority Data

May 28, 2003    (DE) ................................ 103 24 228

(51) Int. Cl.
*F28F 19/00* (2006.01)

(52) U.S. Cl. ................... 165/134.1; 204/196.15

(58) Field of Classification Search ........... 165/97, 165/134.1
See application file for complete search history.

(56) References Cited

U.S. PATENT DOCUMENTS

| | | | |
|---|---|---|---|
| 1,455,139 A * | 5/1923 | Harris ..................... 204/563 |
| 3,128,779 A * | 4/1964 | Morris .................... 134/107 |
| 3,303,118 A * | 2/1967 | Anderson ............ 204/196.02 |
| 3,520,790 A * | 7/1970 | Araki et al. ........ 204/196.26 |
| 3,766,032 A * | 10/1973 | Yeiser ..................... 205/729 |
| 3,984,302 A * | 10/1976 | Freedman et al. ......... 204/274 |
| 4,323,116 A * | 4/1982 | Zimmerman ............... 165/97 |
| 4,586,562 A * | 5/1986 | Carlson et al. .......... 165/134.1 |
| 4,597,871 A * | 7/1986 | Okouchi et al. ............ 210/456 |
| 4,619,671 A * | 10/1986 | Ruff et al. ................ 96/243 |
| 5,088,432 A * | 2/1992 | Usami et al. ............ 204/196.3 |
| 5,237,832 A * | 8/1993 | Alston ........................ 62/200 |
| 5,346,598 A * | 9/1994 | Riffe et al. ..................... 422/6 |
| 6,100,600 A * | 8/2000 | Pflanz .......................... 290/54 |
| 6,197,168 B1 * | 3/2001 | Matsunaga et al. .... 204/196.01 |
| 6,254,930 B1 * | 7/2001 | Kreiselmaier ............... 427/239 |
| 6,269,872 B1 * | 8/2001 | Anderson ................... 165/271 |
| 6,514,401 B1 * | 2/2003 | Chyou et al. ............... 205/739 |
| 6,520,737 B1 * | 2/2003 | Fischer et al. ............... 415/4.3 |
| 6,619,303 B1 * | 9/2003 | Hultqvist ................. 134/104.1 |
| 6,676,122 B1 * | 1/2004 | Wobben ...................... 290/55 |
| 2005/0167989 A1 * | 8/2005 | Kruger-Gotzmann et al. 290/55 |

FOREIGN PATENT DOCUMENTS

| | | |
|---|---|---|
| DE | 100 16 913 A1 | 10/2001 |
| EP | 159885 A2 * | 10/1985 |
| JP | 63190693 A * | 8/1988 |

* cited by examiner

*Primary Examiner*—Allen J. Flanigan
(74) *Attorney, Agent, or Firm*—Pauley Peterson & Erickson

(57) ABSTRACT

A cooling arrangement for an offshore wind energy installation, having a heat-absorbing device for absorbing heat generated by the electronic devices and/or the mechanical devices of the offshore energy installation, which is to be removed, and a coupled heat-dissipating device for dissipating heat to the surrounding water. The heat-absorbing device has a first cooling circuit operated by a fluid coolant which, in a heat exchanger device, transfers the absorbed heat to the heat-dissipating device having an open second cooling circuit operated with the ambient water as the coolant. A plurality of electrodes are arranged on the inner walls of the conduits of the second cooling circuit, which are spaced apart from each other in its extension direction, each of which is connected with a voltage supply device for generating an alternating high voltage between at least two of the electrodes.

19 Claims, 2 Drawing Sheets

COOLING ARRANGEMENT FOR AN OFFSHORE WIND ENERGY INSTALLATION

BACKGROUND OF THE INVENTION

1. Field of the Invention

This invention relates to a cooling arrangement for an offshore wind energy installation, having a heat-absorbing device for absorbing the heat generated by the electronic and/or mechanical devices of the offshore energy installation, to be removed, and a coupled heat-dissipating device for dissipating heat to the surrounding water. The heat-absorbing device has a first cooling circuit operated by a fluid coolant which, in a heat exchanger device, transfers the absorbed heat to the heat-dissipating device having an open second cooling circuit operated by ambient water as the coolant.

2. Discussion of Related Art

An offshore wind energy installation with a heat exchanger system is described by German Patent Reference DE 100 16 913 A1. The tower-shaped offshore wind energy installation has a rotor unit, a gear arrangement and a connected generator for current generation. The occurring losses of efficiency during the generation of current by the generator appear in the form of heat. This waste heat must be removed to prevent overheating and thus damages. Thus a heat-absorbing device is arranged in the area of the generator and the gear arrangement. With a conduit system containing a coolant, the heat-absorbing device is connected with a heat-dissipating device provided in the area of the tower. The conduit system includes a recirculating pump. The heat-dissipating device is arranged in the lower area of the tower, wherein a heat exchanger is provided inside the tower, and heat is removed via a secondary circuit conducting seawater.

Although the heat removal with the aid of the seawater, which is available in sufficient quantities, is very effective, it entails one disadvantage that maintenance of such cooling arrangements for offshore wind energy installation is very expensive, in particular because of heavy algae and mollusk infestation.

It is known in connection with cooling arrangements operated with seawater to employ filters intended to catch organic particles in particular. However, problems often arise because of blockage of these filters by biological material or other particles present in the ambient waters.

SUMMARY OF THE INVENTION

It is one object of this invention to provide a cooling device for offshore wind energy installations mentioned above so that a low maintenance operation is assured, along with the effective prevention of excessive biological growth.

This object of this invention is attained with characteristics taught in this specification and in the claims.

A number of electrodes are arranged on inner walls of conduits of a second cooling circuit and are spaced apart from each other in an extension direction. Each of the electrodes is connected with a voltage supply device for generating an alternating high voltage between at least two of the electrodes. In this case, a high voltage in particular along with a weak current flow is applied to the electrodes to prevent the generation of oxyhydrogen gas to the greatest possible extent.

Because fields of alternating high voltage are built up in at least portions of the conduits, it is possible to effectively prevent the growth of biological material in these areas.

The open cooling circuit of the heat-dissipating device has a first opening for an inlet for inflow of ambient water, and a second opening for an outlet for the outflow of the water heated by the heat to be removed. Thus, fresh cooling water is always available. The ambient water flows through the first opening to the heat exchanger device and, following the absorption of heat from the heat exchanger device, the ambient water flows back into the ambient water through the second opening.

In order to design the cooling arrangement to be electrically neutral toward the exterior, such as potential-free to ground, a first electrode is arranged at the first opening of the cooling circuit and/or a second electrode at the second opening of the cooling circuit, both of which have the same polarity within the alternating cycles.

In accordance with a particularly simple design, the two electrodes arranged at the openings of the cooling circuit can be connected with each other. Thus, both electrodes always have the same potential.

In accordance with one embodiment, it is possible to arrange a pumping device inside the cooling circuit of the heat-dissipating device for conveying the water flow through the conduits of the cooling circuit. It is thus possible with such a pumping device to increase the amount of water being conveyed past the heat exchanger. A particularly good heat removal is thus assured.

In a particularly advantageous manner, the conveying direction of the pumping device can be reversed. Thus the water flow through the conduits occurs in the opposite direction, wherein the ambient water flows through the second opening to the heat exchanger device and, following the absorption of heat from the heat exchanger device, flows back into the ambient water through the first opening. By reversing the flow direction within the open cooling circuit it is possible to flush out particles which already entered into the cooling circuit. The adhesion of biological materials in the cooling circuit is effectively counteracted in this way.

Additionally or alternatively such a flow reversal in the cooling circuit of the heat-dissipating device can also be provided by a controllable valve arrangement. Depending on the desired flow direction of the cooling water it is then possible to open one opening for the inflow of ambient water, and the other opening for the outflow of the water heated by the heat to be dissipated.

Even during the operation of the pumping device in one conveying direction it is possible with the aid of a suitable conduit system and while using further valve arrangements to achieve a reversal of the flow direction in the cooling circuit.

The cooling circuit of the heat-dissipating device can be kept free from undesirable particles in a particularly advantageous manner because the conveying direction of the pumping device, or the flow direction of the cooling water, can be alternatingly reversed. The cooling circuit of the heat-dissipating device is continuously flushed by the cooling water flow continuously changing its direction. No use of additional filters is required.

The biological growth can also be restricted because the cooling circuit of the heat-dissipating device has conduits made of a plastic material. As a rule, a reduced biological growth is observed on plastic materials.

In order to prevent particularly coarse particles from entering the cooling circuit of the heat-dissipating device, a screen, a rake, or the like, which prevents the entry of particles into the cooling circuit, can be arranged at the first opening and/or the second opening of the cooling circuit.

With interplay with the step wherein the flow direction within the open cooling circuit of the heat-dissipating device is reversed, the screen, rakes, etc. are also flushed and thus their blockage is prevented.

BRIEF DESCRIPTION OF THE DRAWINGS

This invention is explained in greater detail in view of an exemplary embodiment represented in the drawings, wherein.

DESCRIPTION OF PREFERRED EMBODIMENTS

Figure 1:
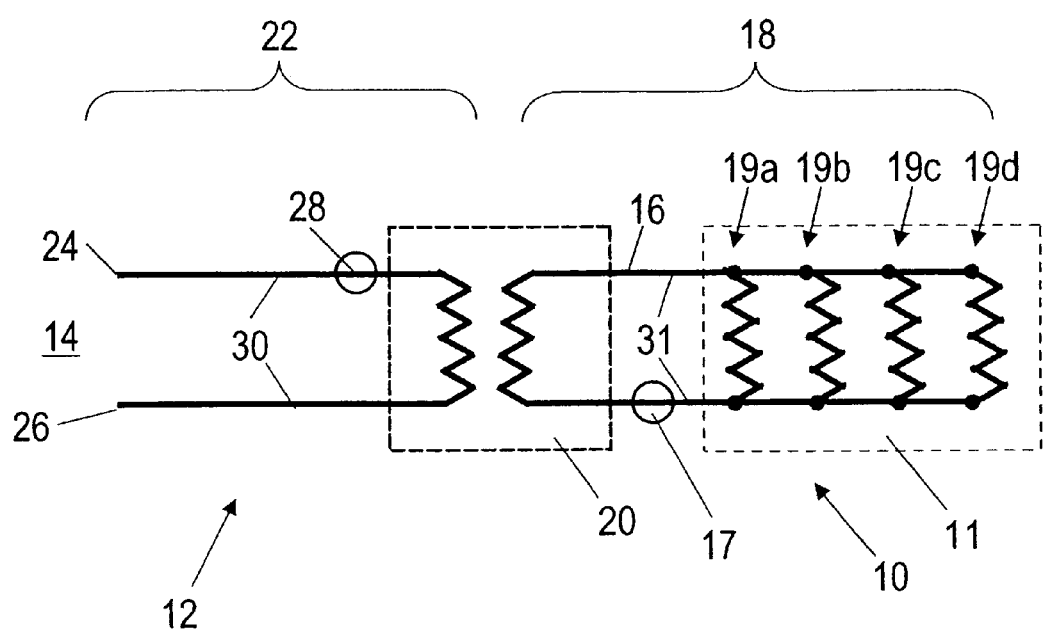
FIG. 1 shows a cooling device in a schematic lateral view and in section.

FIG. 1 shows a cooling device for an offshore wind energy installation in a schematic lateral view and in section. A generator unit 11, driven by a rotor, not shown, is arranged in the gondola, not shown, of a tower-shaped offshore wind energy installation. The generator unit is used for generating current, during which heat is released because of losses in efficiency, which is absorbed by a heat-absorbing device 10 operating with a coolant 16 supplied with antifreeze. In addition, waste heat, for example from switchgear cabinets, must be removed, or electronic circuits must be cooled.

The closed cooling circuit 18 of the heat-absorbing device 10 includes four air/coolant heat exchangers 19a, 19b, 19c and 19d, which can be arranged at the generator 11 and at associated switchgear cabinets and at mechanical components which are heated by waste heat or frictional heat. The heat to be removed can be transferred via the spatially close contact of the components to be cooled with the air/coolant heat exchangers 19a, 19b, 19c and 19d to the coolant 16 flowing through the air/coolant heat exchangers 19a, 19b, 19c and 19d of the heat-absorbing device 10. The flow of the coolant 16 is generated by a pump 17. Further components of the closed cooling circuit 18 of the heat-absorbing device 10, for example a storage container for the coolant, are omitted in FIG. 1.

Alternatively, the electronic components can be cooled directly by the coolant instead of using air/coolant heat exchangers 19a, 19b, 19c and 19d.

The heat-absorbing device 10 is coupled with a heat-dissipating device 12 via a heat exchanger device 20. The heat exchanger device 20 is arranged in the lower portion of the tower, not shown, of the offshore wind energy installation and has a cooling output of 30 to 50 kW. This corresponds to the amount of heat which must be removed from an offshore wind energy installation with an output of 5 MW. The heat-absorbing device 10 is connected with the heat exchanger device 20 by long conduits 31, which are shown shortened in FIG. 1.

The heat-dissipating device 12 includes a further cooling circuit 22, which operates with the ambient water 14 as the coolant. The coolant circuit 22 is open, i.e. seawater as the coolant flows through a first opening 24 into the conduits 30 of the heat-dissipating device 12. A second opening 26 is used for the outflow of the water heated by the heat which must be removed. In the course of this the ambient seawater 14 flows through the first opening 24 to the heat exchanger device 20 and, following the absorption of heat from the heat exchanger device 20, through the second opening 26 into the ambient water 14. Since the first opening 24 is arranged distant from the second opening 26, it is always possible to take up sufficient cool water, i.e. unaffected by the heat absorption, in the cooling circuit 22.

Figure 2:
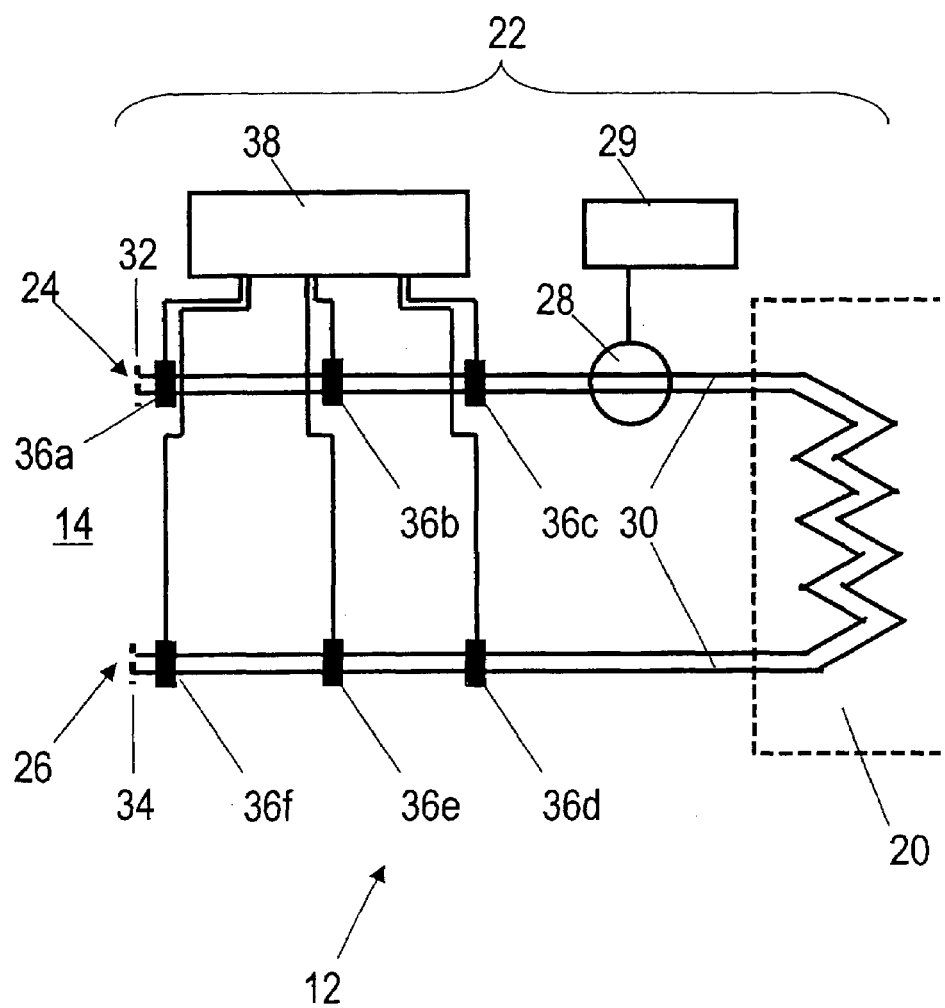
FIG. 2 shows a partial area, in a schematic lateral view and in section, including an open cooling circuit of the heat-dissipating device of the cooling device shown in FIG. 1, wherein further details are shown.

FIG. 2 represents in a schematic lateral view and in section a partial area including the open cooling circuit 22 of the heat-dissipating device 12 of the cooling device represented in FIG. 1. The individual components of the heat-dissipating device 12, which were partially omitted in FIG. 1, are represented in an enlargement. These components will be explained in greater detail in what follows.

Six electrodes 36a, 36b, 36c, 36d, 36e and 36f are arranged, spaced apart from each other in the extension direction of the second cooling circuit 22, on the inner wall of the conduits 30 of the second cooling circuit 22. The three electrodes 36a, 36b and 36c are arranged, spaced apart from each other in the extension direction of the conduit 30, in the area of the first opening 24. The three electrodes 36d, 36e and 36f are arranged, spaced apart from each other in the extension direction of the conduit 30, in the area of the second opening 26. Here, in the embodiment shown in FIG. 2, the electrodes 36a, 36b, 36c, 36d, 36e and 36f are arranged in a ring shape on the inner wall of the conduit 30. It is possible in an alternative manner to form the electrodes 36a, 36b, 36c, 36d, 36e and 36f in a different way, for example as plates, strips or in a grid shape.

The electrodes 36a, 36b, 36c, 36d, 36e and 36f are connected with the voltage supply device 38. The voltage supply device 38 generates an alternating high voltage between each of two electrodes 36a and 36b, 36b and 36c, or 36d and 36e, 36e and 36f. To prevent an oxyhydrogen gas reaction, the voltage applied is high, while the current flow is maintained weak.

Because the electrical alternating current fields are generated at least in the area of the two openings 24 and 26, no animal or plant organisms, which would plug the cooling circuit 22, can settle in the conduit 30.

So that the cooling device is electrically neutral toward the exterior, the two electrodes 36a, 36f arranged directly at the openings 24 and 26 have the same polarity within an alternating pulse. Alternatively, this can be assured by connecting the two electrodes 36a, 36f with each other.

A grid-like screen 32 or 34 is arranged at the first opening 24 and the second opening 26 of the cooling circuit 22 of the heat-dissipating device 12. The screens 32 and 34 are used to prevent coarse particles from entering the cooling circuit 22.

A pump 28, which can be operated by a control device 29 for conveying the water flow through the conduits 30 of the cooling circuit 22, is arranged inside the cooling circuit 22 of the heat-dissipating device 12. Here, the control device 29 regulates the pump 28 so that its conveying direction can be reversed. This results in a cooling water flow through the conduits in the reverse direction, wherein ambient water 14 flows through the second opening 26 to the heat exchanger device 20 and, following the absorption of heat from the heat exchanger device 20, flows through the first opening 24 into the ambient water 14. The screens 32 and 34 at the openings 24 or 26, which can be plugged by particles, are flushed with the reversal of the cooling water flow in the cooling circuit 22.

The control device 29 can alternatingly reverse the conveying direction of the pump 28 and thus also the flow direction of the cooling water. The adhesion of biological material and other particles in the cooling circuit 22 or at the screens 32 and 34 is prevented by the continuous changing of the flow direction. In particular, this is also prevented because the cooling circuit 22 of the heat-dissipating device 12 has conduits 30 made of a plastic material.

In an alternative embodiment, not shown, the cooling circuit of the heat-dissipating device can have a controllable valve arrangement. Depending on the desired flow direction of the cooling water, the valve arrangement can open one opening for the inflow of ambient water, and the other opening for the outflow of the water heated by the heat to be dissipated. Thus, a flow reversal in the cooling circuit can be realized by suitable arrangement of conduits and valves without the conveying direction of the pump needing to be changed.

With the dual circuit cooling system of the cooling device in accordance with this invention, it is possible to keep an offshore wind energy installation, and if desired other installations being cooled by seawater or lake water, free of algae and mollusk growth at and/or in the seawater. It is possible with a simple structure to build an alternating voltage field near or in the area of the seawater inlet and/or outlet openings in the cooling water circuit, which organic creatures will not use as a habitat. The plugging of screens and filters by biological material is thus counteracted.

German Patent Reference 103 24 228.7, the priority document corresponding to this invention, and its teachings are incorporated, by reference, into this specification.

What is claimed is:

1. A cooling arrangement for an offshore wind energy installation, having a heat-absorbing device (10) for absorbing heat generated by at least one of electronic devices and mechanical devices (11) of the offshore energy installation, and a heat-dissipating device (12) coupled with the at least one of the electronic devices and the mechanical devices (11) for dissipating the heat to the surrounding ambient water (14), wherein the heat-absorbing device (10) has a first cooling circuit (18) operated by a fluid coolant (16) which in a heat exchanger device (20) transfers absorbed heat to the heat-dissipating device (12) having an open second cooling circuit (22) operated with the ambient water (14) as the coolant, the cooling arrangement comprising:

a first opening (24) formed in the second cooling circuit (22) of the heat-dissipating device (12) as an inlet for the ambient water (14) and a second opening (26) as an outlet for the ambient water (14) heated by the heat to be removed, wherein the ambient water (14) flows through the first opening (24) to the heat exchanger device (20) and following absorotion of heat from the heat exchanger device (20) flows back into the ambient water (14) through the second opening (26); and a plurality of electrodes (36a, 36b, 36c, 36d, 36e, 36f) arranged on inner walls of conduits (30) of the second cooling circuit (22) and spaced apart from each other in an extension direction, each of the electrodes (36a, 36b, 36c, 36d, 36e, 36f) connected with a voltage supply device (38) for generating an alternating high voltage and a weak current between at least two of the electrodes (36a, 36b, 36c, 36d, 36e, 36f), wherein at least a portion of the plurality of electrodes are arranged in an area of the first opening (24) and a corresponding portion of the plurality of electrodes are arranged in an area of the second opening (26).

2. The cooling arrangement in accordance with claim 1, wherein at least one of a first electrode (36a) of the electrodes is arranged at least at the first opening (24) of the cooling circuit (22) and a second electrode (36f) of the electrodes is arranged at least at the second opening (26) of the cooling circuit (22), and the first electrode (36a) and the second electrode (36f) have a same polarity within one alternating cycle.

3. The cooling arrangement in accordance with claim 2, wherein the first electrode (36a) and the second electrode (36f) are arranged at the first and the second openings (24, 26) of the cooling circuit (22) and are connected with each other.

4. The cooling arrangement in accordance with claim 3, wherein a pump (28, 29) is arranged inside the cooling circuit (22) of the heat-dissipating device (12) for conveying the ambient water (14) through the conduits of the cooling circuit (22).

5. The cooling arrangement in accordance with claim 4, wherein a conveying direction of the pump (28, 29) is reversible so that the ambient water (14) flows through the conduits in an opposite direction, wherein the ambient water (14) flows through the second opening (26) to the heat exchanger device (20) and. following absorption of heat from the heat exchanger device (20) flows back into the ambient water (14) through the first opening (24).

6. The cooling arrangement in accordance with claim 5, wherein the second cooling circuit (22) of the heat-dissipating device (12) has a controllable valve arrangement which, depending on a desired flow direction of the cooling water, opens one of the first and the second openings (24, 26) for an inflow of the ambient water (14), and opens an other of the second and the first opening (26 or 24) for an outflow of the ambient water heated by the heat to be dissipated.

7. The cooling arrangement in accordance with claim 6, wherein one of the conveying direction of the pump (28, 29) and a flow direction of the cooling water is alternatingly reversible.

8. The cooling arrangement in accordance wit claim. 7, wherein the cooling circuit (22) of the heat-dissipating device (12) has the conduits (30) made of a plastic material.

9. The cooling arrangement in accordance wit claim 7, wherein one of a screen (32, 34), a rake, and a filter device prevents entry of particles into the cooling circuit (22), is arranged near at least one of the first opening (24) and the second opening (26) of the cooling circuit (22) of the heat-dissipating device (12).

10. The cooling arrangement in accordance with claim 1, wherein a first electrode (36a) and a second electrode (36f) of the electrodes are arranged at the first and the second openings (24, 26) of the cooling circuit (22) and are connected with each other.

11. The cooling arrangement in accordance with claim 1, wherein a pump (28, 29) is arranged inside the cooling circuit (22) of the heat-dissipating device (12) for conveying the ambient water (14) through the conduits of the cooling circuit (22).

12. The cooling arrangement in accordance with claim 11, wherein a conveying direction of the pump (28, 29) is reversible so tat the ambient water (14) flows through the conduits in an opposite direction, wherein the ambient water (14) flows through the second opening (26) to the heat exchanger device (20) and following absorption of heat from the heat exchanger device (20) flows back into the ambient water (14) through the first opening (24).

13. The cooling arrangement in accordance with claim 1, wherein the second cooling circuit (22) of the heat-dissipating device (12) has a controllable valve arrangement which, depending on a desired flow direction of the cooling water, opens one of the first and the second openings (24, 26) fox an inflow of the ambient water (14), and opens an other of the second and the first opening (26 or 24) for an outflow of the ambient water heated by the heat to be dissipated.

14. The cooling arrangement in accordance with claim 5, wherein one of the conveying direction of the pump (28, 29) and a flow direction of the cooling water is alternatingly reversible.

15. The cooling arrangement in accordance with claim 1, wherein the cooling circuit (22) of the heat-dissipating device (12) has the conduits (30) made of a plastic material.

16. The cooling arrangement in: accordance with claim 1, wherein one of a screen (32, 34), a rake, and a filter device prevents entry of particles into the cooling circuit (22), is arranged near at least one of the first opening (24) and the second opening (26) of the cooling circuit (22) of the heat-dissipating device (12).

17. A cooling arrangement for an offshore wind energy installation, having a heat-absorbing device (10) for absorbing heat generated by at least one of electronic devices and mechanical devices (11) of the offshore energy installation, and a heat-dissipating device (12) coupled with the at least one of the electronic devices and the mechanical devices (11) for dissipating the heat to the surrounding ambient water (14), wherein the heat-absorbing device (10) has a first cooling circuit (18) operated by a fluid coolant (16) which in a heat exchanger device (20) transfers absorbed heat to the heat-dissipating device (12) having an open second cooling circuit (22) operated with the ambient water (14) as the coolant, the cooling arrangement comprising:
 a first opening (24) formed in the second cooling circuit (22) of the heat-dissipating device (12) as an inlet for the ambient water (14) and a second opening (26) as an outlet for the ambient water (14) heated by the heat to be removed, wherein the ambient water (14) flows Through the first opening (24) to the heat exchanger device (20) and following absorption of heat from the heat exchanger device (20) flows back into the ambient water (14) through the second opening (26);
 a plurality of electrodes (36a, 36b, 36c, 36d, 36e, 36f) arranged on inner walls of conduits (30) of the second cooling circuit (22) and spaced apart from each other in an extension direction, each of the electrodes (36a, 36b, 36c, 36d, 36e, 36f) connected with a voltage supply device (38) for generating an alternating high voltage between at least two of the electrodes (36a, 36b, 36c, 36d, 36e, 36f), wherein three electrodes (36a, 36b, 36c) are arranged in an area of the first opening (24) and a corresponding three electrodes (36d, 36e, 36f) are arranged in an area of the second opening (26); and
 a pump (28, 29) arranged inside the cooling circuit (22) of the heat-dissipating device (12) for conveying the ambient water (14) through the conduits of the cooling circuit (22), wherein a conveying direction of the pump (28, 29) is reversible so that the ambient water (14) flows through the conduits in an opposite direction, wherein the ambient water (14) flows through the second opening (26) to the heat exchanger device (20) and following absorption of heat from the heat exchanger device (20) flows back into the ambient water (14) through the first opening (24).

18. The cooling arrangement in accordance with claim 17, wherein at least one of a first electrode (36a) of the electrodes is arranged at least at the first opening (24) of the cooling circuit (22) and a second electrode (36f) of the electrodes is arranged at least at the second opening (26) of the cooling circuit (22), and the first electrode (36a) and the second electrode (36f) have a same polarity within one alternating cycle.

19. The cooling arrangement in accordance with claim 18, wherein the first electrode (36a) and the second electrode (36f) are arranged at the first and the second openings (24, 26) of the cooling circuit (22) and are connected with each other.

* * * * *